United States Patent
Stephenne et al.

(10) Patent No.: US 9,781,726 B2
(45) Date of Patent: Oct. 3, 2017

(54) SYSTEM AND METHOD FOR USING A SUPER BIN FOR RADIO RESOURCE REQUIREMENT ASSESSMENT

(71) Applicant: Futurewei Technologies, Inc., Plano, TX (US)

(72) Inventors: Alex Stephenne, Stittsville (CA); Gamini Senarath, Ottawa (CA); Aaron Callard, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 353 days.

(21) Appl. No.: 14/461,187

(22) Filed: Aug. 15, 2014

(65) Prior Publication Data

US 2016/0050670 A1   Feb. 18, 2016

(51) Int. Cl.
*H04W 72/04* (2009.01)
*H04W 72/08* (2009.01)

(52) U.S. Cl.
CPC ..... *H04W 72/0486* (2013.01); *H04W 72/085* (2013.01)

(58) Field of Classification Search
None
See application file for complete search history.

(56) References Cited

U.S. PATENT DOCUMENTS

| | | | |
|---|---|---|---|
| 2009/0310501 A1* | 12/2009 | Catovic | H04W 24/08 370/252 |
| 2014/0219104 A1 | 8/2014 | Senarath et al. | |
| 2014/0295873 A1* | 10/2014 | Lunden | H04W 52/146 455/454 |

FOREIGN PATENT DOCUMENTS

| | | |
|---|---|---|
| CN | 101594659 A | 12/2009 |
| CN | 101621828 A | 1/2010 |
| EP | 2461528 A | 6/2012 |
| WO | 2014093921 A1 | 6/2014 |

* cited by examiner

*Primary Examiner* — Alex Skripnikov
(74) *Attorney, Agent, or Firm* — Slater Matsil, LLP

(57) ABSTRACT

Embodiments are provided for assessing radio resource requirements using virtual bin virtualization. An embodiment method includes receiving a service request from a user equipment (UE) in a geographical bin. Resource requirements are then obtained, from a lookup table (LUT), for a serving radio node and neighbor radio nodes associated with the geographic bin of the UE. The LUT comprises a plurality of entries that map combinations of path losses of wireless links for the serving radio node and neighbor radio nodes to corresponding combinations of resource requirements. The entries of the path losses further include one or more service specific and network node parameters for the serving radio nodes and neighbor radio nodes, which are also mapped to the resource requirements. The obtained resource requirements are then assessed, including deciding whether to serve the UE according to the resource requirements and to resource availability.

24 Claims, 6 Drawing Sheets

SYSTEM AND METHOD FOR USING A SUPER BIN FOR RADIO RESOURCE REQUIREMENT ASSESSMENT

TECHNICAL FIELD

The present invention relates to the field of network communications, and, in particular embodiments, to a system and method for a super bin concept for radio resource requirement assessment for user equipments (UEs).

BACKGROUND

Network operators are tasked with equitably distributing finite shared resources (e.g., bandwidth, spectral efficiency, forwarding paths, radio nodes, radio channels, or other network resources) amongst multiple users in a manner that satisfies the users' collective quality of service (QoS) requirements. Conventional techniques allocate network resources in an ad hoc manner (e.g., on a case-by-case basis), which satisfies QoS requirements at the expense of overall resource utilization efficiency. For example, in wireless environments, spectrum bandwidth may be allocated to satisfy an individual service request without considering how interference resulting from increased traffic load will reduce spectral efficiency over nearby interferences. Accordingly, mechanisms and techniques for more efficiently allocating resources in a network are needed in order to satisfy ever increasing demands of next generation networks.

SUMMARY OF THE INVENTION

In accordance with an embodiment of the disclosure, a method by a network component for assessing radio resource requirements using bin virtualization includes receiving a service request from a user equipment (UE) in a geographical bin. The method further includes obtaining resource requirements for a serving radio node and neighbor radio nodes associated with the geographic bin of the UE from a lookup table (LUT). The LUT comprises a plurality of entries that map combinations of path losses of wireless links for each of the serving radio node and neighbor radio nodes to corresponding combinations of resource requirements for the serving radio node and neighbor radio nodes. Each distinct combination of path losses in one or more entries of the LUT represents a virtual bin. The obtained resource requirements are assessed, including deciding whether to serve the UE according to the obtained resource requirements and to resource availability.

In accordance with another embodiment of the disclosure, a network component for assessing radio resource requirements using bin virtualization includes at least one processor and a non-transitory computer readable storage medium storing programming for execution by the at least one processor. The programming includes instructions to receive a service request from a UE in a geographical bin. The instructions further include instructions to obtain resource requirements for a serving radio node and neighbor radio nodes associated with the geographic bin of the UE from a LUT. The LUT comprises a plurality of entries that map combinations of path losses of wireless links for each of the serving radio node and neighbor radio nodes to corresponding combinations of resource requirements for the serving radio node and neighbor radio nodes. Each distinct combination of path losses in one or more entries of the LUT represents a virtual bin. The network component is further configured to assess the resource requirements.

In accordance with another embodiment of the disclosure, a method by a network component for bin virtualization for radio resources assessment includes, for each considered service type, collecting information indicating multiple combinations of path losses of wireless links for a plurality of radio nodes. The combinations of path losses are then mapped to corresponding combinations of resource requirements for each considered serving node and corresponding neighbor nodes. The combinations of path losses and the corresponding resource requirements are maintained in entries in a LUT for assessing radio resource requirements. Each distinct combination of path losses in one or more entries of the LUT represents a virtual bin.

In accordance with yet another embodiment of the disclosure, a network component for bin virtualization for radio resources assessment includes at least one processor and a non-transitory computer readable storage medium storing programming for execution by the at least one processor. The programming includes instructions to, for each considered service type, collect information indicating multiple combinations of path losses of wireless links with service specific and network node parameters for a plurality of radio nodes. The programming includes further instructions to map the combinations of path losses to corresponding combinations of resource requirements for each considered serving node and corresponding neighbor nodes. The instructions further maintain the combinations of path losses with service specific and network node parameters and the corresponding resource requirements in entries in a LUT for assessing radio resource requirements. Each distinct combination of path losses in one or more entries of the LUT represents a virtual bin.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Embodiments are provided herein for assessing radio resource requirement of user equipments (UEs) using a super bin concept. The embodiments includes a method for abstracting radio access node (RAN) characteristics for estimating the resource requirement for a given service for a user at a particular location (e.g., at a defined bin area). The resource requirement is estimated or assessed for the purpose of administration and traffic management purposes (e.g., admission control, traffic engineering, cost control). The embodiments allow network operators to compute the cost of providing resources for a user at a specific location using a lookup table (LUT) designed for this purpose, without having to recomputed LUT information for each new UE location associated with a given network deployment. The same unchanged LUT can be used even if there is a change in the network deployment (e.g., adding a new radio node) for a UE anywhere in the network.

Figure 1:
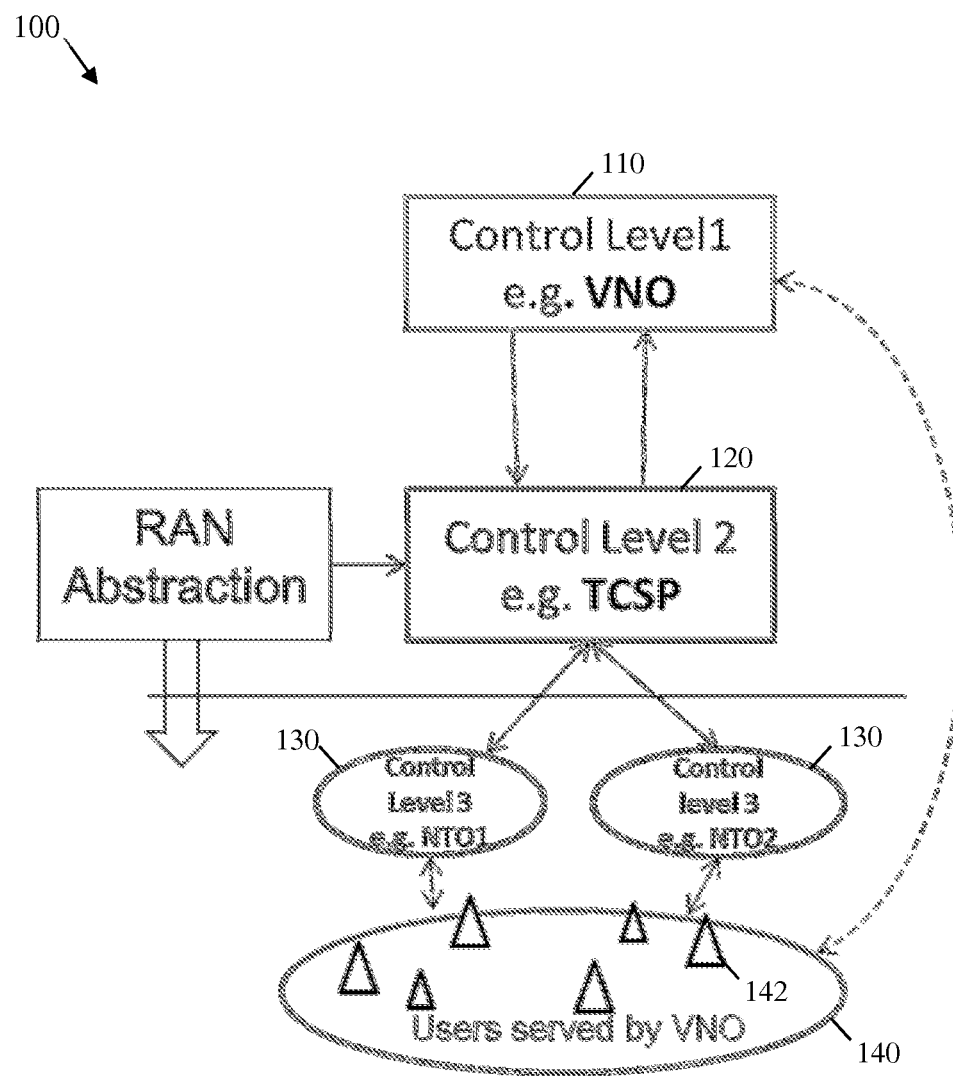
FIG. 1 illustrates an example of a hierarchical control architecture for determining resources for serving users in a network.

FIG. 1 shows an example of a hierarchical control architecture 100 for determining resources for serving users in a network. The hierarchical control architecture 100 comprises multiple control layers for assessing radio resource requirements of UEs (not shown), controlling network resources, and managing user traffic/services accordingly. The UE may be any user communications or computing device that has a wireless communications capability, such as a smartphone, a laptop or tablet computer, or other mobile devices. The control layers include a first control layer 110 (Control Level 1), e.g., at the virtual network operator (VNO) such as a public safety office, and a second control layer 120 (Control Level 2), e.g., at a Telecommunications Connectivity Service Provider (RSCP) that negotiates service across networks and provides service to VNOs. The control layers also include third control layers 130 (Control Level 3) such as for network operators that own RANs 142 (e.g., base stations) and/or other segments of the network 140. The higher control layers, such as the first control layer 110 or the second control layer 120, can use RAN abstractions of the lower layers to make quick decisions avoiding dynamic consultations (or decoupling operations) with lower layers and hiding the lower layer details. The lower layers can still provide efficient use of resources/services and slow control management information for resource usage.

Figure 2:
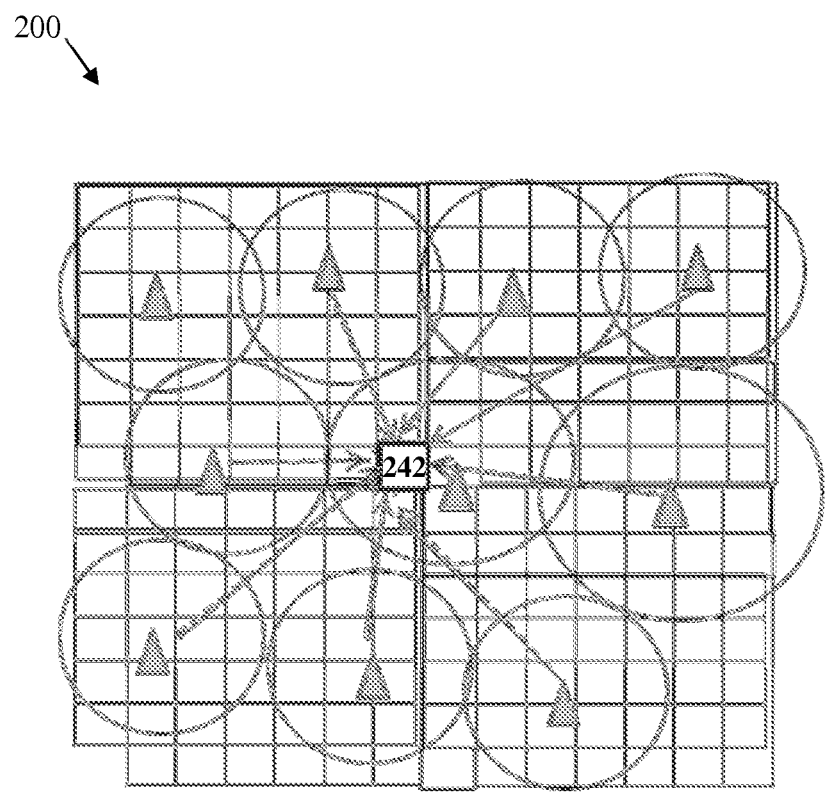
FIG. 2 illustrates a model of radio access node (RAN) abstraction.

FIG. 2 shows a radio access node (RAN) abstraction model 200 that can be implemented in the hierarchical control architecture 100. The abstraction model 200 considers resource requirement (RR) or the total cost of adding a service as a defined function of a serving cell for a UE, user location 242 (bin_id), neighbor loading information ($L_1, \ldots, L_n$) from the neighbor cells (n is an integer), and service type (S). This can be expressed as [$RR_1, RR_2, \ldots RR_n$]=f(bin_id, $L_1, L_2, \ldots, L_n$, S), or Total Cost increase=f(bin_id, $L_1, L_2, \ldots, L_n$, S). A remote central unit or monitoring entity, such as a controller at a higher control layer, can assess the resource requirement by knowing the current loading of the cells and user location. The entity uses knowledge of the $L_1$ to $L_n$ and possibly other characteristics, such as scheduler type, Radio Access Technology (RAT type) or other relevant information to assess the average resource requirements of adding a service.

The information in the abstraction model 200 is linked to position and context. To train the abstraction model 200, the function f( ) are obtained using online data collection, off-line data collection, using emulated traffic, or using simulations. All relevant combinations of parameter values should be swept for each geographical bin. Further, depending on the accuracy required by the algorithm using the abstraction, a quantizer should be applied to restrict the LUT containing the information to a manageable size. This is a bin based abstraction that couples physical bin (location) and a specific infrastructure topology. When a new infrastructure node is introduced, the resource requirements has to be re-assessed again for all the positions (bins) and possible context combinations, which increases computations time and cost and thus reduces efficiency.

In an embodiment, a super bin concept is introduced to make the bin abstraction cover a generic infrastructure, e.g., independent of network infrastructure topology and changes to the infrastructure topology. Specifically, each super bin is a virtual bin that corresponds to a functional mapping from a particular combination of input variables (multidimensional function of quantized inputs), to make the abstraction independent of any specific infrastructure. Each virtual bin corresponds to a specific combination of path losses of wireless links as seen by a UE, irrespective of the geographical location. Similar to the abstraction model 200, the super bin abstraction model builds the LUT using online data collection, off-line data collection, emulated traffic, or simulations, and by quantizing the data. However, unlike the model 200, the LUT is build and trained over all physical geographical bins and can then be used irrespective of the actual geographical bin of interest. The information in the super bin abstraction model is linked to the context considering all geographical bins regardless of location or network architecture. Since any geographical bin has a context, any bin can be mapped to a super bin regardless of location. Additionally, a database is established to map the positions of a UE to a virtual bin (combination of path losses as seen by the UE). Thus, if the network infrastructure topology is changed, e.g., a base station is added or removed, the mapping is modified accordingly without changing the LUT.

Figure 3:
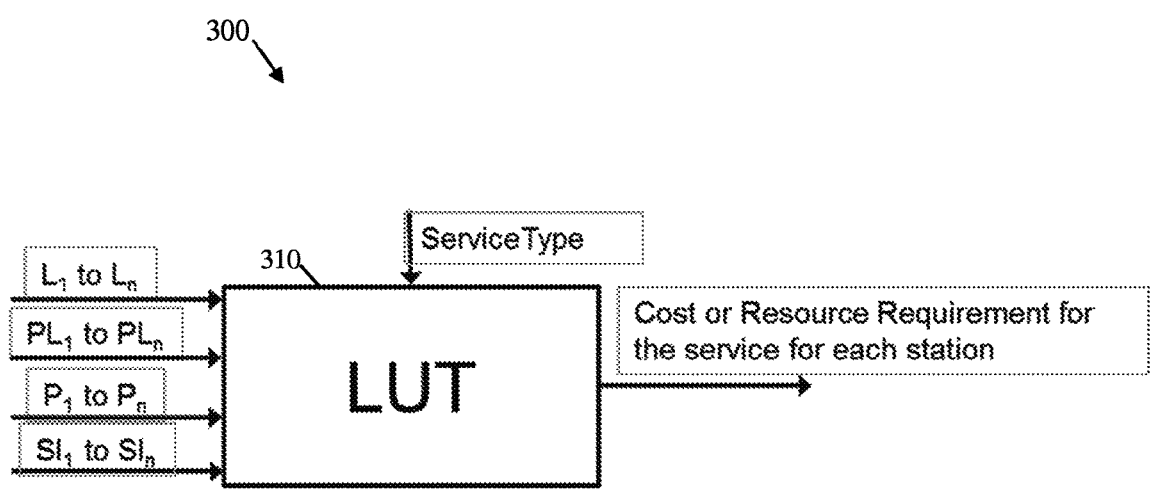
FIG. 3 illustrates an embodiment of a scheme for building a LUT for super bin abstraction.

FIG. 3 shows an embodiment of a scheme 300 for building a LUT for super bin abstraction. The scheme 300 includes identifying all path losses on links that can be seen by a UE ($PL_1, \ldots, PL_n$) from the cells and service specific and network node parameters for which the impact on the resource utilization and/or cost is to be captured. The service specific and network node parameters include cell loading information ($L_1, \ldots, L_n$), mean transmission powers ($P_1, \ldots, P_n$) from the cells, and system information from the transmit/receive stations ($SI_1, \ldots, SI_n$). The term cell and station are used herein interchangeably assuming a cell corresponds to one station. For example, the SI includes characteristics such as scheduler type, power control, and/or joint processing capability for each station (or RAN). A LUT 310 is then trained to map those parameters to the resource utilization and/or cost for each station by sweeping the values of those parameters.

In addition to path loss and the service and network node parameters, the speed (speed) and direction of the user may also be used as dependent parameters in some scenarios. In addition to direct resource utilization and resource cost, the probability of assignment to a cell may also be provided as an output. The probability of assignment can be applied to the resource cost for a cell to assess resources. For instance, an expected resource requirement for each of the cells may be evaluated using a product of the two outputs, such as P_assign(cell)×Resource_cost(cell). In other embodiments, other suitable input parameters and output metrics for assessing resources can be added as entries to the LUT.

The LUT inputs (e.g., $L_1$ to $L_n$, $PL_1$ to $PL_n$, $P_1$ to $P_n$, $SI_1$ to $SI_n$) are quantized. The quantization requirements depend on the requirements of the application. For example, for admission control (AC), loading quantization for low loads can be very rough (coarse quantization) in comparison to traffic engineering (TE) requirement. There may also be practical limitations in possible ranges of each variable. For example, multi-dimensional non-uniform quantization could be done based on probability of occurrence of certain combination of parameters. The actual location of each station (or RAN) does not matter directly in the mapping. For instance, the stations can be sorted according to a given parameter. In one implementation, the neighbour stations are ordered according to the signal strength of each station assuming the maximum transmit power of that station. The loading and other characteristics are then provided in the same order.

Figure 4:
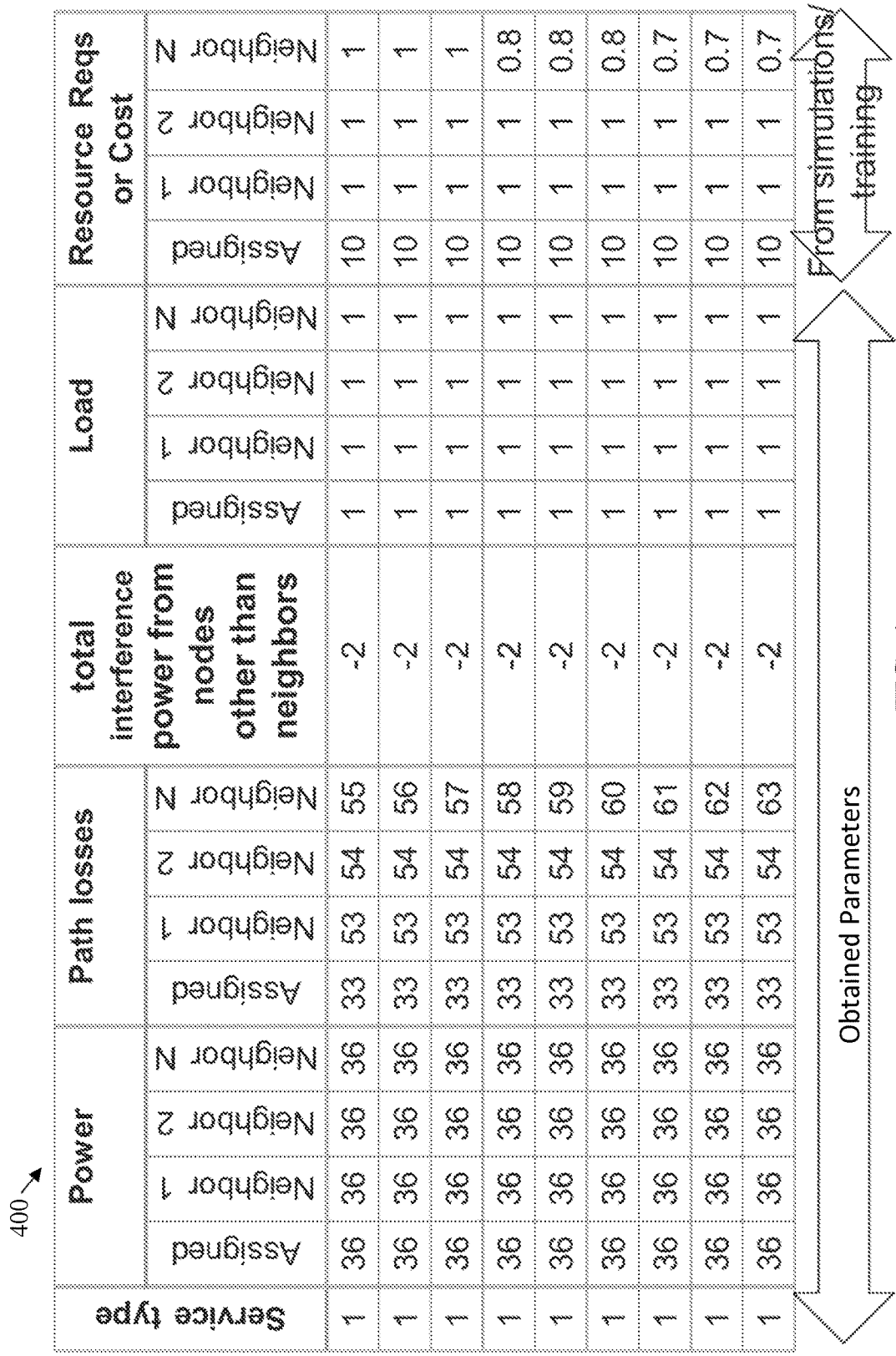
FIG. 4 illustrates an example of a LUT for super bin abstraction.

FIG. 4 shows an example of a LUT 400 for super bin abstraction. The LUT 400 includes a plurality of entries corresponding to a service type (service type 1). Other service types may have similar corresponding entries. The entries for the service type include path losses, service specific and network node parameters, for which the impact on the resource utilization/cost is to be captured, and a corresponding mapping of resource requirements/cost. This information is captured, e.g., by a monitoring unit in the network, using online data collection, off-line data collection, emulated traffic, simulations, or combinations thereof. In an embodiment, the controller in charge or assessing RRs for UEs and controlling resources accordingly is the same as the monitoring entity in charge of collecting and mapping such resources into entries in the LUT. In another embodiment, the two entities are separate.

The path losses and service/network parameters are quantized, e.g., into discrete numbers to facilitate processing and handling (e.g., sorting, comparing) the data in the table. The service/network parameters include mean transmission powers (Power) from the cells/stations, loading information (Load) from the cells/stations, and total interference power from nodes other than neighbors. Other embodiments can include different information, additional information such as SI, or combinations thereof. The path losses and different parameters are arranged in columns for the serving station/cell and n neighbor stations/cells. Each row includes a different combination of quantized values for the path losses and the considered parameters. Further, in each row, the quantized values for the serving and neighbor cells are sorted (e.g., in ascending order). This facilitates searching and comparison of entries in the table, which can speed processing time and decision making at the controller.

The corresponding mapping of resource requirements/cost to the different combinations of path losses and parameters can be obtained by training schemes (e.g., using actual data and feedback from the network over time) and/or simulations. Thus, each entry corresponding to a combination is mapped to a corresponding combination of resource requirement/cost values for the serving/neighbor cells. The LUT 400 may be static, e.g. obtained once via simulations considering all possible or practical combinations of values. A combination of resource requirements/cost in an entry can correspond to different scenarios of user location and/or network topology. In the LUT, each combination of path losses represents a virtual or super bin. For each combination of path losses or virtual bins, the LUT can include multiple entries, each corresponding to a different combination of the service/network parameters.

Although, the LUT 400 shows service specific and network node parameters associated with the path losses in the rows, this is not a requirement. In other scenarios, path losses for serving/neighbor nodes can be mapped to resource requirements/cost without including service specific and network node parameters. In other embodiments, any suitable service specific and network node parameters can be included, for example other than the parameters shown in LUT 400. The LUT 400 can also be updated over time, e.g., via training or feedback. However, the updates are not on a dynamic or relatively fast scale with network changes since there is no need to change entries each time network architecture or topology is changed (e.g., due to adding/removing stations or other resources). The entries in the LUT 400 are expected to already account for such changes. For example, the combinations of values in the LUT 400 cover such changes or all possibilities of network topology that affect the considered parameters.

In an embodiment, a database is established to map the current position of a UE to a virtual bin (combination of path losses). This database can be modified if network deployment is changed (e.g., a new base station is deployed). The LUT above, in which there may be multiple rows for each virtual bin (combination of path losses) representing all relevant possible combinations of service specific and network node parameters for that virtual bin, would not change with the deployment change. The LUT may be the same no matter where the LUT is used in the world, as long as the rows still span all combinations of service specific and network node parameters.

Figure 5:
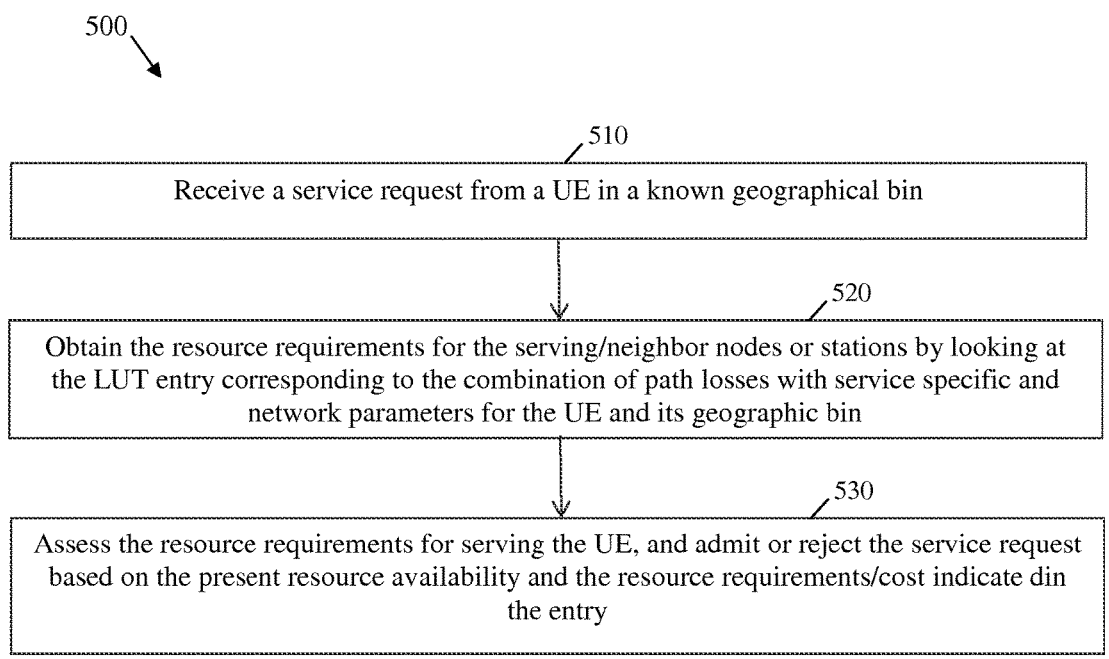
FIG. 5 illustrates a embodiment of a method for resource control using super bin abstraction.

FIG. 5 illustrates an embodiment of a method 500 for resource control using super bin abstraction. For instance, the method 500 can use the LUT 500 to assess RR for a UE and control/manage resources accordingly. The method 500 can be implemented at a higher control layer or controller, such as the first control layer 110 or the second control layer 120. At step 510, a service request is received from a UE in a known geographical bin. At step 520, the resource requirements for the serving/neighbor nodes or stations (e.g., RANs or base stations) are obtained by looking at a LUT entry corresponding to the combination of path losses with service specific and network parameters for the UE and its geographic bin (e.g., power/load). The LUT is maintained by the network's monitoring entity or the controller. At step 530, the resource requirements are assessed for serving the UE. The service request is accepted or rejected based on the present resource availability and the resource requirements/cost indicated in the entry.

Figure 6:
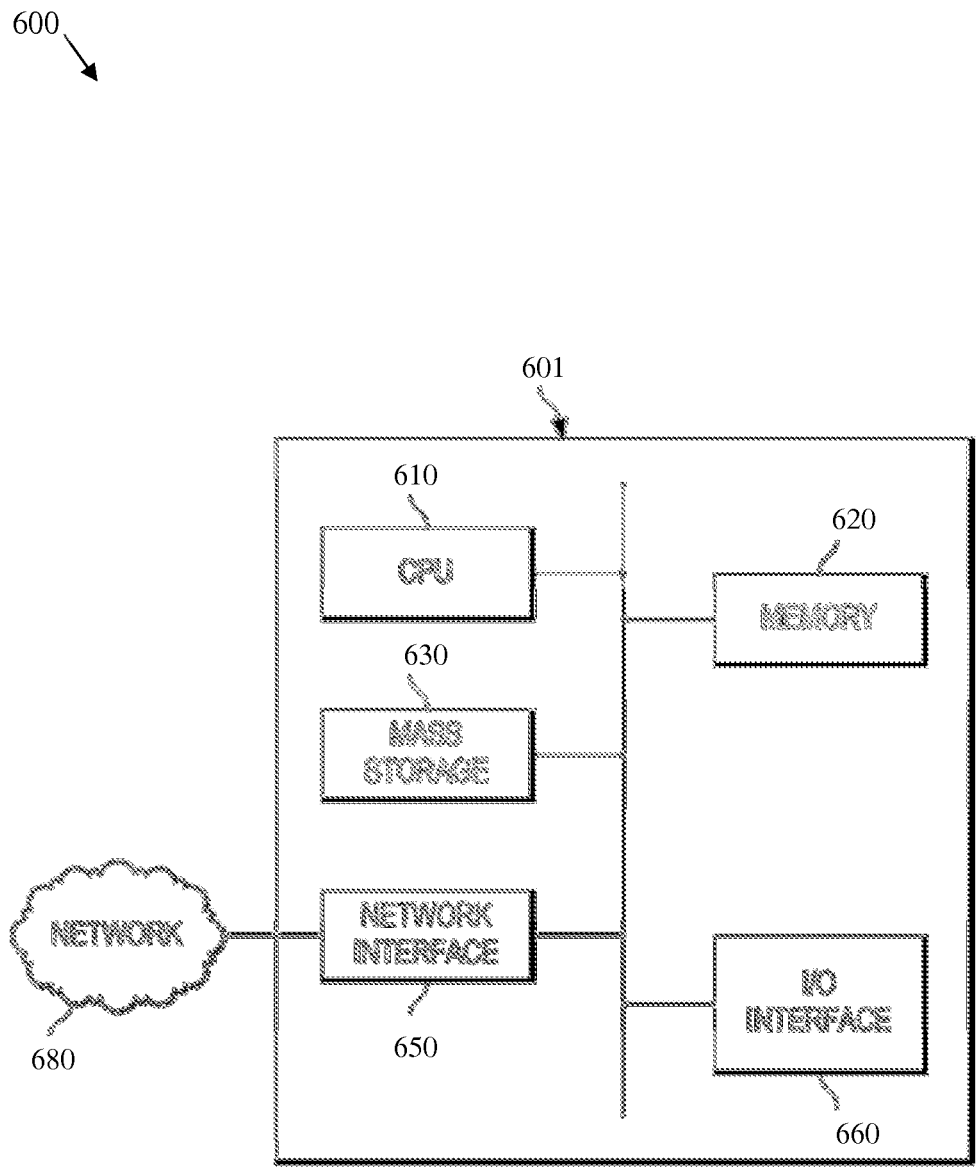
FIG. 6 is a diagram of a processing system that can be used to implement various embodiments.

FIG. 6 is a block diagram of an exemplary processing system 600 that can be used to implement various embodiments. For instance, the processing system 600 corresponds to or is part of a controller or monitoring entity in a network. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 600 may comprise a processing unit 601 equipped with one or more input/output devices, such as a network interfaces, storage interfaces, and the like. The processing unit 601 may include a central processing unit (CPU) 610, a memory 620, a mass storage device 630, and an I/O interface 660 connected to a bus. The bus may be one or more of any type of several bus architectures including a memory bus or memory controller, a peripheral bus or the like.

The CPU 610 may comprise any type of electronic data processor. The memory 620 may comprise any type of system memory such as static random access memory (SRAM), dynamic random access memory (DRAM), synchronous DRAM (SDRAM), read-only memory (ROM), a combination thereof, or the like. In an embodiment, the memory 620 may include ROM for use at boot-up, and DRAM for program and data storage for use while executing programs. In embodiments, the memory 620 is non-transitory. The mass storage device 630 may comprise any type of storage device configured to store data, programs, and other information and to make the data, programs, and other information accessible via the bus. The mass storage device 630 may comprise, for example, one or more of a solid state drive, hard disk drive, a magnetic disk drive, an optical disk drive, or the like.

The processing unit 601 also includes one or more network interfaces 650, which may comprise wired links, such as an Ethernet cable or the like, and/or wireless links to access nodes or one or more networks 680. The network interface 650 allows the processing unit 601 to communicate with remote units via the networks 680. For example, the network interface 650 may provide wireless communication via one or more transmitters/transmit antennas and one or more receivers/receive antennas. In an embodiment, the processing unit 601 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method by a network component for assessing radio resource requirements using bin virtualization, the method comprising:

receiving a service request from a user equipment (UE) in a geographical bin;
obtaining resource requirements for a serving radio node and neighbor radio nodes associated with the geographic bin of the UE from a lookup table (LUT), wherein the LUT comprises a plurality of entries that map combinations of path losses of wireless links for each of the serving radio node and neighbor radio nodes to corresponding combinations of resource requirements for the serving radio node and neighbor radio nodes, and wherein each distinct combination of path losses in one or more entries of the LUT represents a virtual bin; and
responding to the service request according to parameters associated with the service request from the UE, the obtained resource requirements, and resource availability.

2. The method of claim 1, further comprising deciding whether to serve the UE according to the parameters associated with the service request from the UE, the obtained resource requirements, and the resource availability.

3. The method of claim 1, wherein the entries comprising the path losses further include one or more service specific and network node parameters for the serving radio node and neighbor radio nodes, wherein the one or more service specific and network node parameters are mapped with the path losses to the resource requirements for the serving radio node and neighbor radio nodes.

4. The method of claim 3, wherein the service specific and network node parameters include at least one of mean transmission powers or loading information of each of the serving radio node and neighbor radio nodes.

5. The method of claim 3, wherein the service specific and network node parameters include total interference power from radio nodes other than the serving radio node and neighbor radio nodes.

6. The method of claim 3, wherein the service specific and network node parameters include system information of each of the serving radio node and neighbor radio nodes, and wherein the system information include information about at least one of scheduler type, power control, or joint processing capability for the serving radio node and neighbor radio nodes.

7. The method of claim 3, wherein the service specific and network node parameters are all associated with a service according to the request.

8. The method of claim 1, wherein the entries comprising the path losses further include at least one of speed or direction parameters of the UE, and wherein the at least one of speed or direction parameters of the UE are mapped with the path losses to the resource requirements for the serving radio node and neighbor radio nodes.

9. The method of claim 1, wherein the resource requirements include at least one of resource utilization, resource cost, or probability of resource assignment.

10. The method of claim 1, wherein the virtual bin is independent of the geographical bin of the UE and of network topology and architecture.

11. The method of claim 1, wherein the network component is a controller at a higher network layer than a radio access network (RAN) level.

12. The method of claim 11, wherein the LUT is maintained by the controller or a network monitoring entity configured to communicate with the controller.

13. A network component for assessing radio resource requirements using bin virtualization, the network component comprising:

at least one processor; and a non-transitory computer readable storage medium storing programming for execution by the at least one processor, the programming including instructions to:
receive a service request from a user equipment (UE) in a geographical bin;
obtain resource requirements for a serving radio node and neighbor radio nodes associated with the geographic bin of the UE from a lookup table (LUT), wherein the LUT comprises a plurality of entries that map combinations of path losses of wireless links for each of the serving radio node and neighbor radio nodes to corresponding combinations of resource requirements for the serving radio node and neighbor radio nodes, and wherein each distinct combination of path losses in one or more entries of the LUT represents a virtual bin; and
respond to the service request according to parameters associated with the service request from the UE, the obtained resource requirements, and resource availability.

14. The network component of claim 13, wherein the programming includes further instructions to decide whether to serve the UE according to the parameters associated with the service request from the UE, the obtained resource requirements, and the resource availability.

15. The network component of claim 13, wherein the entries comprising the path losses further include one or more service specific and network node parameters for the serving radio node and neighbor radio nodes, wherein the service specific and network node parameters are mapped with the path losses to the resource requirements for the serving radio node and neighbor radio nodes.

16. The network component of claim 15, wherein the service specific and network node parameters include at least one of mean transmission powers, or loading information of each of the serving radio node and neighbor radio nodes.

17. The network component of claim 15, wherein the service specific and network node parameters include total interference power from radio nodes other than the serving radio node and neighbor radio nodes.

18. The network component of claim 15, wherein the service specific and network node parameters include system information of each of the serving radio node and neighbor radio nodes, and wherein the system information include information about at least one of scheduler type, power control, or joint processing capability for the serving radio node and neighbor radio nodes.

19. The network component of claim 15, wherein the service specific and network node parameters are all associated with a service according to the request.

20. The network component of claim 13, wherein the network component is a controller at a higher network layer than a radio access network (RAN) level.

21. The network component of claim 20, wherein the LUT is maintained by the controller or a network monitoring entity configured to communicate with the controller.

22. The network component of claim 13, wherein the entries comprising the path losses further include at least one of speed or direction parameters of the UE, and wherein the at least one of speed or direction parameters of the UE are mapped with the path losses to the resource requirements for the serving radio node and neighbor radio nodes.

23. The network component of claim 13, wherein the resource requirements include at least one of resource utilization, resource cost, or probability of resource assignment.

24. The network component of claim 13, wherein the virtual bin is independent of the geographical bin of the UE and of network topology and architecture.

* * * * *